(12) United States Patent
Gao et al.

(10) Patent No.: US 9,679,601 B2
(45) Date of Patent: *Jun. 13, 2017

(54) POST-WRITE SCAN OPERATIONS FOR INTERLACED MAGNETIC RECORDING

(71) Applicant: Seagate Technology LLC, Cupertino, CA (US)

(72) Inventors: Kaizhong Gao, North Oaks, MN (US); Wenzhong Zhu, Apple Valley, MN (US); Tim Rausch, Farmington, MN (US); Edward Gage, Lakeville, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/089,239

(22) Filed: Apr. 1, 2016

(65) Prior Publication Data

US 2016/0307595 A1 Oct. 20, 2016

Related U.S. Application Data

(63) Continuation of application No. 14/688,667, filed on Apr. 16, 2015, now Pat. No. 9,324,362.

(60) Provisional application No. 62/110,039, filed on Jan. 30, 2015, provisional application No. 62/083,696, (Continued)

(51) Int. Cl.
| | | |
|---|---|---|
| *G11B 5/09* | (2006.01) |
| *G11B 20/10* | (2006.01) |
| *G11B 20/18* | (2006.01) |
| *G11B 20/12* | (2006.01) |
| *G11B 5/012* | (2006.01) |
| *G11B 5/00* | (2006.01) |

(52) U.S. Cl.
CPC .... *G11B 20/10212* (2013.01); *G11B 20/1217* (2013.01); *G11B 20/1833* (2013.01); *G11B 5/012* (2013.01); *G11B 2005/0021* (2013.01); *G11B 2020/10898* (2013.01); *G11B 2020/1238* (2013.01); *G11B 2020/1292* (2013.01); *G11B 2020/1869* (2013.01)

(58) Field of Classification Search
None
See application file for complete search history.

(56) References Cited

U.S. PATENT DOCUMENTS

| | | |
|---|---|---|
| 4,030,130 A | 6/1977 | Smith |
| 4,298,897 A | 11/1981 | Arter et al. |
| 4,535,372 A | 8/1985 | Yeakley |

(Continued)

FOREIGN PATENT DOCUMENTS

| | | |
|---|---|---|
| EP | 0484774 A2 | 5/1992 |
| EP | 1564736 A2 | 8/2005 |

(Continued)

*Primary Examiner* — Peter Vincent Agustin
(74) *Attorney, Agent, or Firm* — Holzer Patel Drennan

(57) ABSTRACT

A storage device includes a data degradation management module that tracks a risk of data degradation by incrementing a track write counter of a first data track responsive to each data write command to a second data track, such as a data track directly adjacent to the first data track. If a count of the track write counter exceeds a count threshold, one or more post-write scan operations are performed to assess and/or repair data degradation of the first data track.

19 Claims, 4 Drawing Sheets

Related U.S. Application Data filed on Nov. 24, 2014, provisional application No. 62/083,732, filed on Nov. 24, 2014.

(56) References Cited

U.S. PATENT DOCUMENTS

| | | | |
|---|---|---|---|
| 4,622,601 A | 11/1986 | Isozaki et al. | |
| 4,646,168 A | 2/1987 | Sonobe et al. | |
| 4,771,346 A | 9/1988 | Shoji et al. | |
| 4,803,571 A | 2/1989 | Fujioka et al. | |
| 4,853,799 A | 8/1989 | Aikawa | |
| 5,010,430 A | 4/1991 | Yamada et al. | |
| 5,285,341 A | 2/1994 | Suzuki et al. | |
| 5,402,270 A | 3/1995 | McDonnell et al. | |
| 5,760,993 A | 6/1998 | Purkett | |
| 5,892,634 A | 4/1999 | Ito et al. | |
| 5,978,168 A | 11/1999 | Mathews et al. | |
| 6,052,797 A | 4/2000 | Ofek | |
| 6,104,562 A | 8/2000 | Ottesen et al. | |
| 6,185,063 B1 | 2/2001 | Cameron | |
| 6,710,960 B1 | 3/2004 | Yorimitsu | |
| 6,768,605 B2 | 7/2004 | Yamamoto | |
| 7,130,152 B1 | 10/2006 | Raymond et al. | |
| 7,259,927 B2 | 8/2007 | Harris | |
| 7,393,066 B2 | 7/2008 | Dugas et al. | |
| 7,440,222 B2 | 10/2008 | Nakamura et al. | |
| 7,573,682 B2 | 8/2009 | Pust et al. | |
| 7,872,829 B2 | 1/2011 | Sakai | |
| 7,907,360 B2 | 3/2011 | Mak et al. | |
| 7,957,093 B2 | 6/2011 | Brand | |
| 7,965,465 B2 | 6/2011 | Sanvido et al. | |
| 8,023,215 B1 | 9/2011 | Ghaly et al. | |
| 8,310,777 B2 | 11/2012 | Biskeborn et al. | |
| 8,310,782 B2 | 11/2012 | Song et al. | |
| 8,531,792 B1 | 9/2013 | Burd et al. | |
| 8,531,793 B2 | 9/2013 | Bandic et al. | |
| 8,537,481 B1* | 9/2013 | Bandic | G11B 27/36 360/31 |
| 8,599,510 B1 | 12/2013 | Fallone | |
| 8,693,123 B1 | 4/2014 | Guo et al. | |
| 8,699,159 B1 | 4/2014 | Malina | |
| 8,699,162 B1 | 4/2014 | Grobis et al. | |
| 8,711,517 B2 | 4/2014 | Erden et al. | |
| 8,854,752 B2 | 10/2014 | Jin et al. | |
| 8,867,161 B2 | 10/2014 | Emo et al. | |
| 8,873,178 B2 | 10/2014 | Erden et al. | |
| 8,913,335 B2 | 12/2014 | Coker et al. | |
| 8,917,469 B1 | 12/2014 | Guo et al. | |
| 8,929,186 B1 | 1/2015 | Sharma et al. | |
| 8,976,478 B1 | 3/2015 | Harllee et al. | |
| 9,053,712 B1 | 6/2015 | Guo et al. | |
| 9,058,829 B1 | 6/2015 | Wolf et al. | |
| 9,082,458 B1 | 7/2015 | Tang | |
| 9,087,541 B1 | 7/2015 | Pokharel et al. | |
| 9,099,103 B1 | 8/2015 | Krichevsky | |
| 9,105,302 B1 | 8/2015 | Erden et al. | |
| 9,111,575 B1 | 8/2015 | Zhou et al. | |
| 9,111,578 B1 | 8/2015 | Hassel et al. | |
| 9,129,658 B1 | 9/2015 | Yamamoto | |
| 9,142,246 B1 | 9/2015 | Trantham et al. | |
| 9,153,287 B1 | 10/2015 | Hamilton et al. | |
| 9,324,362 B1* | 4/2016 | Gao | G11B 20/1833 |
| 9,396,062 B1 | 7/2016 | Sridhara et al. | |
| 9,418,688 B1 | 8/2016 | Rausch et al. | |
| 2002/0035666 A1 | 3/2002 | Beardsley et al. | |
| 2002/0035704 A1 | 3/2002 | Wilson | |
| 2002/0105867 A1 | 8/2002 | Tamaru et al. | |
| 2003/0214886 A1 | 11/2003 | Sakamoto et al. | |
| 2005/0078399 A1 | 4/2005 | Fung et al. | |
| 2005/0157597 A1 | 7/2005 | Sendur et al. | |
| 2006/0215511 A1 | 9/2006 | Shin et al. | |
| 2007/0047415 A1 | 3/2007 | Chang | |
| 2007/0050593 A1 | 3/2007 | Chen et al. | |
| 2007/0174582 A1 | 7/2007 | Feldman | |
| 2008/0002272 A1 | 1/2008 | Riedel | |
| 2008/0239901 A1 | 10/2008 | Tsunokawa et al. | |
| 2008/0316639 A1 | 12/2008 | Tang et al. | |
| 2009/0244775 A1* | 10/2009 | Ehrlich | G11B 5/012 360/135 |
| 2009/0251821 A1 | 10/2009 | Song et al. | |
| 2010/0014183 A1* | 1/2010 | Aoki | G11B 5/09 360/71 |
| 2010/0027406 A1 | 2/2010 | Krause et al. | |
| 2010/0271727 A1 | 10/2010 | Namkoong et al. | |
| 2010/0321817 A1 | 12/2010 | Aida et al. | |
| 2012/0014013 A1 | 1/2012 | Bandic et al. | |
| 2012/0194946 A1* | 8/2012 | Watanabe | G11B 5/012 360/78.04 |
| 2013/0148225 A1 | 6/2013 | Coker et al. | |
| 2013/0155826 A1 | 6/2013 | Zhang et al. | |
| 2013/0294207 A1 | 11/2013 | Erden et al. | |
| 2014/0016224 A1 | 1/2014 | Unoki et al. | |
| 2014/0043708 A1 | 2/2014 | Erden et al. | |
| 2014/0055881 A1 | 2/2014 | Zaharris | |
| 2014/0153134 A1 | 6/2014 | Han et al. | |
| 2014/0160589 A1 | 6/2014 | Deki et al. | |
| 2014/0285923 A1 | 9/2014 | Aoki et al. | |
| 2015/0178161 A1 | 6/2015 | Burd et al. | |
| 2016/0148630 A1 | 5/2016 | Rausch | |
| 2016/0148635 A1 | 5/2016 | Zhu et al. | |
| 2016/0148636 A1 | 5/2016 | Ma et al. | |
| 2016/0148637 A1 | 5/2016 | Rausch et al. | |
| 2016/0148642 A1 | 5/2016 | Gao | |
| 2016/0148643 A1 | 5/2016 | Gao et al. | |
| 2016/0148644 A1 | 5/2016 | Zhu et al. | |
| 2016/0148645 A1 | 5/2016 | Zhu et al. | |

FOREIGN PATENT DOCUMENTS

| | | |
|---|---|---|
| JP | H02-240862 A2 | 9/1990 |
| WO | 2005-030869 A1 | 4/2005 |

* cited by examiner

POST-WRITE SCAN OPERATIONS FOR INTERLACED MAGNETIC RECORDING

CROSS-REFERENCE TO RELATED APPLICATIONS

The present application is a continuation application of U.S. application Ser. No. 14/688,667, issued as U.S. Pat. No. 9,324,362, which claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014, and also to U.S. Provisional Patent Application No. 62/110,039, entitled "Post-Write Scan Operations for Interlaced Magnetic Recording" and filed on Jan. 30, 2015. Each of these applications is specifically incorporated by reference for all that they disclose or teach.

BACKGROUND

As requirements for data storage density increase for magnetic media, cell size decreases. One technique for adapting the magnetic medium to utilize smaller cells while preventing adjacent data from being overwritten during a write operation is shingled magnetic recording (SMR). SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

Another technique for increasing ADC of the magnetic medium is interlaced magnetic recording (IMR). IMR makes use of alternating data tracks of variable written track width and variable linear densities. For example, odd-numbered data tracks may have a wide written track width and a first linear density, while even-numbered data tracks have a narrower written track width and a second, different linear density. Track boundaries can be defined such that tracks of narrower width slightly overlap the underlying written tracks of wider track width. In IMR systems, some data tracks are randomly writable and other data tracks are not randomly writable.

In each of the above-described types of data storage systems, a risk of data degradation exists due to an effect known as adjacent track interference (ATI). Some systems implement one or more integrity-assurance techniques, such as direct offline scans or periodic track re-writes, to monitor and reduce a severity data degradation. Better data management techniques are desired to reduce a strain on processing resources and increase storage device performance while achieving or improving upon the ADC of these existing systems.

BRIEF DESCRIPTIONS OF THE DRAWINGS

SUMMARY

According to one implementation, a method provides for incrementing a track write counter of a first data track responsive to a data write command to a second data track and reading the first data track if a count of the track write counter satisfies a threshold. If a number of read errors detected during the reading of the first data track satisfies an error threshold, the method further provides for re-writing the first data track and at least one directly adjacent data track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
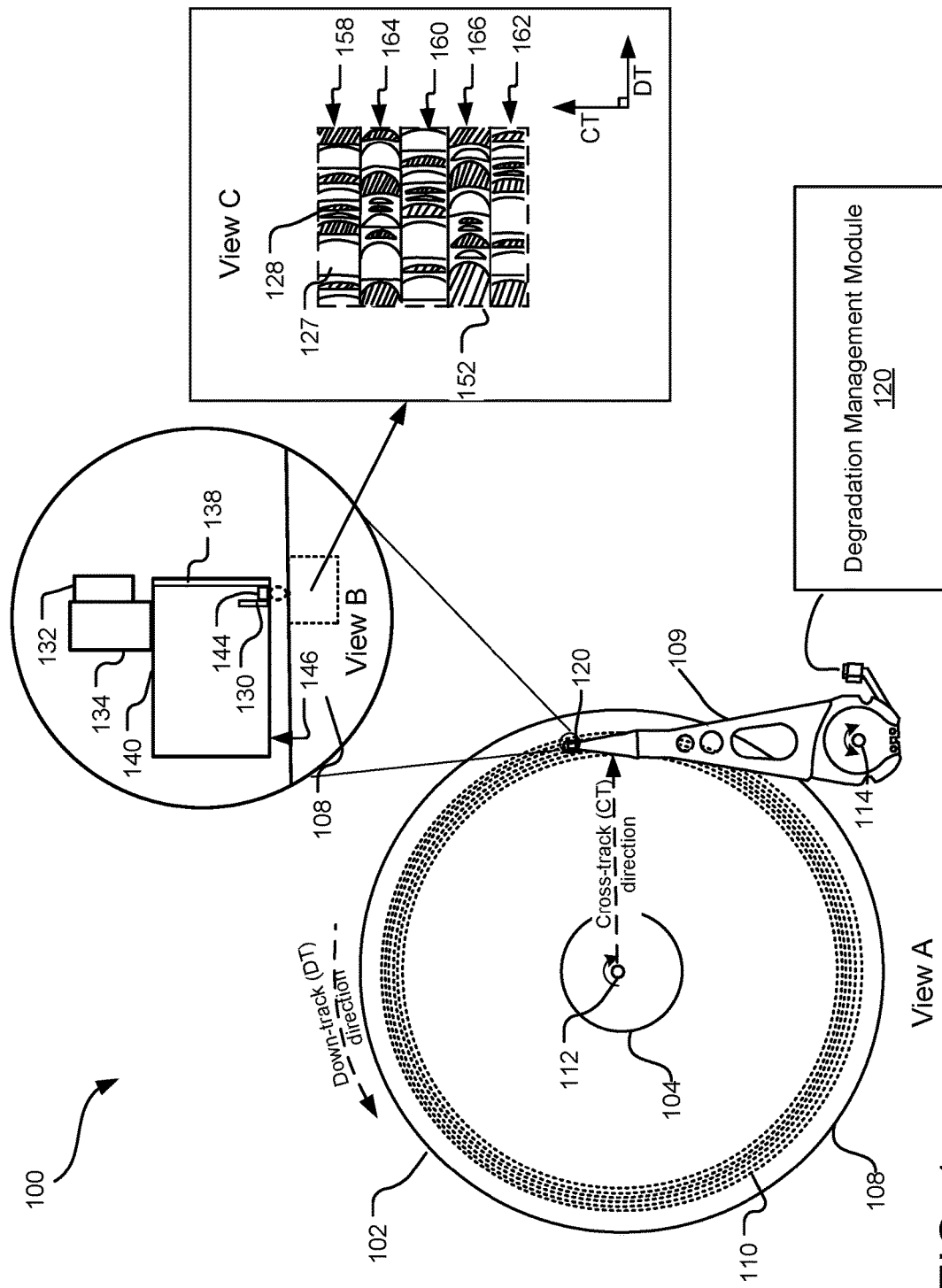
FIG. 1 illustrates an example data storage device including a transducer head assembly for writing data on a magnetic storage medium.

FIG. 1 illustrates an example data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

In one implementation employing heat-assisted magnetic recording (HAMR) (e.g., View B), magnetic grains on the storage medium 108 are temporarily heated during the recording process to selectively lower magnetic coercivity in a tightly focused area of the storage medium 108 that substantially corresponds to an individual data bit. The heated region is then encoded with the recorded data bit based on the polarity of an applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

Referring to View B, the transducer head assembly 120 includes, among other features, a heat source 132 (e.g., a laser) coupled to a submount assembly 134. Light from the heat source 132 is directed into a waveguide 138 mounted to a slider 140. Light exiting the waveguide is focused, via a Near Field Transducer (NFT) 144, and applied to a bit location on the storage medium 108 just before the bit location is subjected to a magnetic pulse generated by the write pole 130. As an air-bearing surface 146 of the slider 140 "flies" across the surface of the storage medium 108, the write pole 130 selectively magnetizes the underlying magnetic grains of the storage medium 108.

View C illustrates a magnified view 152 of magnetic polarized regions (e.g., individual data bits or groupings of data bits of like polarity) recorded on storage medium 108 according to one write methodology of the magnetic storage device 100. The polarized regions are also referred to herein as "data bits" (e.g., data bits 127, 128), which each represent one or more individual data bits of a same state (e.g., 1s or 0s). For example, the data bit 127 is a magnetically polarized region representing multiple bits of a first state (e.g., "000"), while the data bit 128 is an oppositely polarized region representing one or more bits of a second state (e.g., a single "1").

The data bits of the magnified view 152 illustrate data storage according to an interlaced magnetic recording (IMR) technique. IMR utilizes alternating data tracks of different written track widths arranged with slightly overlapping written track boundaries so that a center-to-center distance between directly adjacent tracks (e.g., the track pitch) is uniform across the surface of the magnetic medium 108. For example, the IMR technique shown in the magnified view 152 illustrates alternating data tracks of two different written track widths. A first series of alternating tracks (e.g., the tracks 158, 160, and 162) have a wider written track width than a second series of interlaced data tracks (e.g., 164 and 166).

In the magnified view 152, each wide data track of the first series is written before the narrow and directly adjacent data tracks of the second series. For example, the data track 160 is written before data is written to either of the data tracks 164 and 166. Data writes to the data tracks 164 and 166 overwrite outer edge portions of the data track 160; however, the data track 160 is still readable due to sufficient information retained in a center region of the data track 160.

Because each data track of wide written track width is written prior to directly adjacent data tracks of narrower written track width, the data tracks of the wider written track width (e.g., data tracks 158, 160, and 162) are also referred to herein as "bottom tracks," while the alternating data tracks of narrower written width (e.g., the data tracks 164 and 166) are referred to herein as "top tracks." In one implementation, the bottom tracks of wider written track width include data stored at a higher linear density than the top tracks of narrower written track width.

IMR can allow for higher areal recording densities than other conventional recording techniques. However, one consequence of IMR is that the bottom tracks (e.g., the data tracks 158, 160, and 162) are not randomly writable when data is stored on directly adjacent top data tracks. As used herein, a data track is "randomly writable" when the data track can be individually re-written multiple times without significantly degrading data on other adjacent data tracks. An adjacent data track is "significantly degraded" if reading the data track results in a number of read errors in excess of a maximum number of errors that can be corrected by a correction code (ECC) of the data storage device 100.

According to one implementation of the disclosed technology, a data write to a bottom data track entails reading data of any directly adjacent data tracks into a memory location and re-writing a group of data tracks in a single write operation. For example, re-writing the data track 160 may entail the following operations in the following order: (1) reading the immediately adjacent top data tracks 164 and 166 into a memory location; (2) writing the new data to the data track 160; and (3) subsequently writing data to the top data tracks 164 and 166 from the memory location.

In general, the top data tracks in the data storage device 100 are randomly writeable. For example, the data track 166 can be re-written up to some threshold number of times without significantly degrading data on the adjacent tracks 160 and 162. However, after many repeated re-writes of a top data track (such as the data track 166), data on the immediately adjacent data tracks (e.g., one or both bottom tracks 160 and 162) may become corrupted due to a gradual degradation effect known as adjacent track interference (ATI) (also referred to as adjacent track erasure (ATE)).

To mitigate and rectify the effects of ATI, a degradation management module 118 of the data storage device 100 implements certain data management techniques including systematic data scans and periodic track re-writes. In one implementation, the degradation management module 118 maintains track write counters for each of the bottom data tracks and increments each counter responsive to data write commands to one or more of the immediately adjacent top data tracks. For example, a track write counter for the data track 160 increments each time data is written to either of the directly adjacent top data tracks 164 and 166.

When a count value of a particular track write counter satisfies a predetermined count threshold, the degradation management module 118 reads the associated bottom data track and determines a number of resulting read errors. If the number of read errors exceeds an error threshold, the degradation management module 118 may elect to re-write data of the associated bottom data track and one or more immediately adjacent data tracks. Further details of this and other data management processes are described with respect to FIGS. 2-4 below.

The degradation management 120 includes software and/or hardware, and may be implemented in any tangible computer-readable storage media within or communicatively coupled to the storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
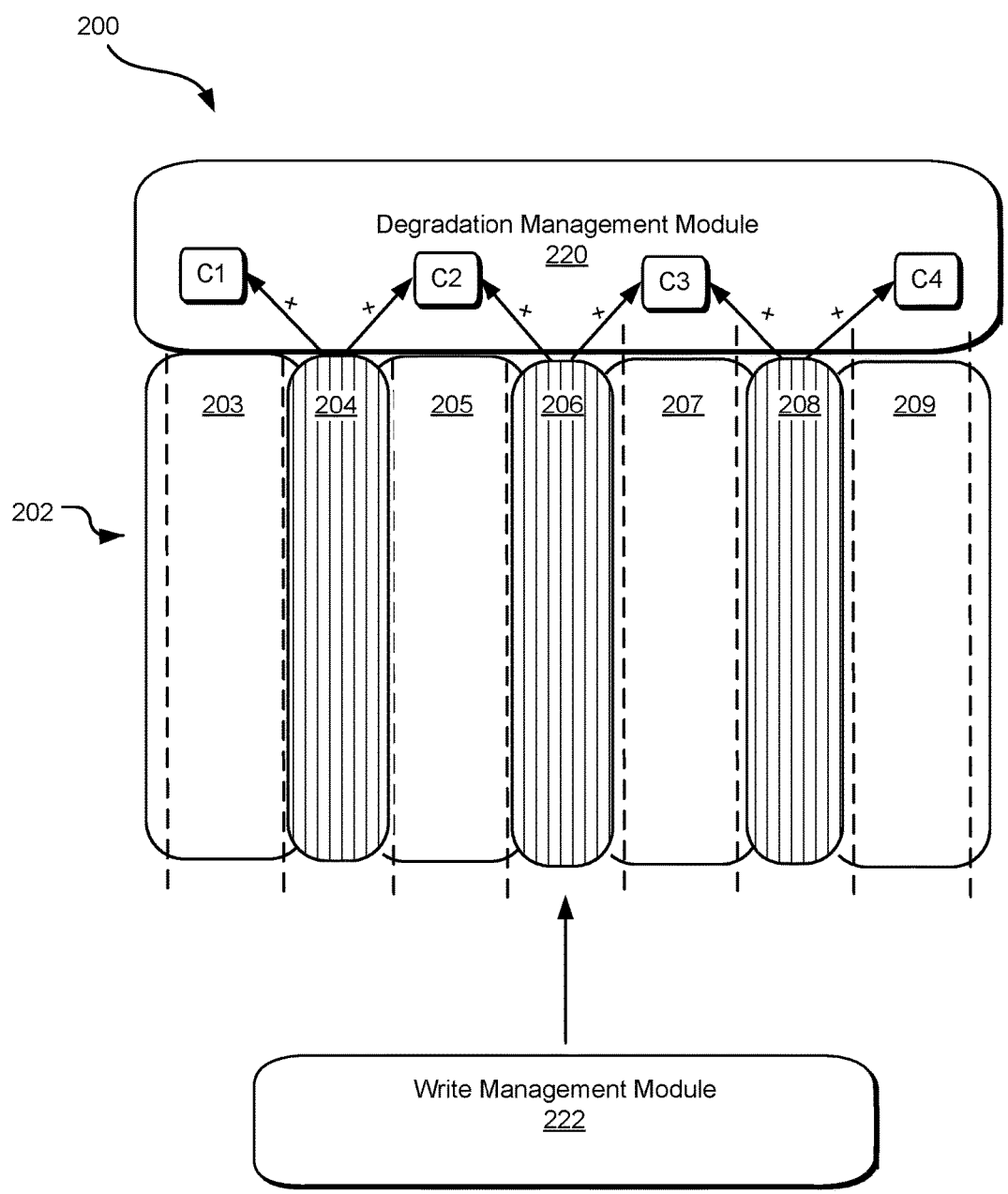
FIG. 2 illustrates an example data management system implementing interlaced magnetic recording (IMR) storage techniques.

FIG. 2 illustrates an example data management system 200 implementing IMR storage techniques. The data management system 200 includes a magnetic disc 202 including a number of substantially circular data tracks (e.g., data tracks 203-209) storing data at variable written track widths and linear densities. For example, the odd-numbered data tracks 203, 205, 207 and 209 (collectively, the "bottom data tracks") store data at a first written track width and linear density while the even-numbered data tracks 204, 206, and 208 (collectively, the "top data tracks") store data at a second written track width and linear density.

A read/write management module 222 manages read and write operations of the data management system 200 and ensures that each of the bottom data tracks of the magnetic disc 202 receives data before either of the directly-adjacent top data tracks. For example, the read/write management module 222 writes data to a bottom data track 205 before writing any data to either of the immediately adjacent and slightly overlapping top data tracks 204 and 206.

In general, the top data tracks can be individually (e.g., randomly) updated and re-written a threshold number of times without causing significant degradation to any of the bottom data tracks. In contrast, the bottom data tracks are not randomly writeable if directly adjacent to a data-storing top data track. For example, the bottom data track 205 is not randomly writable and updating the bottom data track 205 entails executing the following operations in the following order: (1) reading data of the top data tracks 204 and 206 into a memory location; (2) writing the bottom data track 205 to include the updated data; and (3) subsequently re-writing the data of the top data tracks 204 and 206 from the memory location.

Over time, ATI resulting from repeated data writes to one or more of the top data tracks can cause some data degradation on the immediately adjacent bottom data tracks. In general, a small degree of data degradation may be acceptable if the data is repairable via an error correction code (ECC) of the data management system 200. However, if the data degradation becomes too severe, the ECC may be unable to repair the data.

To address the aforementioned ATI concerns, a degradation management module 220 monitors data degradation and repairs data degradation on a continuous basis throughout the life of a storage device including the data management system 200. To help monitor severity of degradation at various places on the magnetic disc 200, the degradation management module 220 manages a number of write counters (e.g., write counters C1, C2, C3, and C4) that are each associated with one of the bottom data tracks (e.g., 203, 205, 207 and 209, respectively).

When data is received on one of the top data tracks, the degradation management module 220 increments track write counter(s) of any of the bottom tracks directly adjacent to the top track receiving the data. For example, the write counter C1 of the bottom data track 203 increments each time the top data track 204 receives data; the write counter C2 of the bottom data track 205 increments each time either of the top data tracks 204 and 206 receive data; the write counter C3 of the bottom data track 207 increments each time either of the top data tracks 206 and 208 receive data; and the write counter C4 of the bottom data track 209 increments each time the top data track 208 receives data. Each of the counters C1, C2, C3, and C4 is associated with a predetermined count threshold. When a count of any of the track write counters equals the predetermined count threshold, the degradation management module 220 initiates one or more post-write scan operations to assess and, optionally, to repair data degradation. The predetermined count threshold may be the same or different for each of the different write track counters. In one implementation, some regions of the magnetic disc 202 store higher priority data than other regions. Write track counters associated with the high priority regions have a lower count threshold than lower priority regions. In another implementation, all write track counters in the data management system 200 have a same predetermined count threshold.

In one implementation, the degradation management module 220 initiates a direct offline scan (DOS) of a bottom data track when the associated track write counter reaches a count threshold. For example, the degradation management module 220 may initiate a DOS of the data track 205 when a count of the track write counter C2 equals a predetermined count threshold.

A DOS, also referred to as a defective data scan, is one example of a post-write scan operation. The purpose of the DOS is to measure degradation to a particular data track, such as degradation that is due to ATI. During the DOS, data is read back from a data track. An error correction code (ECC) repairs errors in the read data to the extent possible, and the degradation management module 220 counts a number of correctable read errors. If the number of correctable read errors satisfies an error threshold, the degradation management module 220 may elect to re-write the data of that data track to repair data degradation.

Other post-write scan operations include, for example, re-writing a data track if a DOS indicates the data track is significantly degraded, resetting a write counter for the re-written data track, or incrementing one or more write counters responsive to re-writes of any top data tracks. Additional post-write scan operations performed by the degradation management module are described with respect to FIGS. 3A and 3B, below.

Figure 3A:
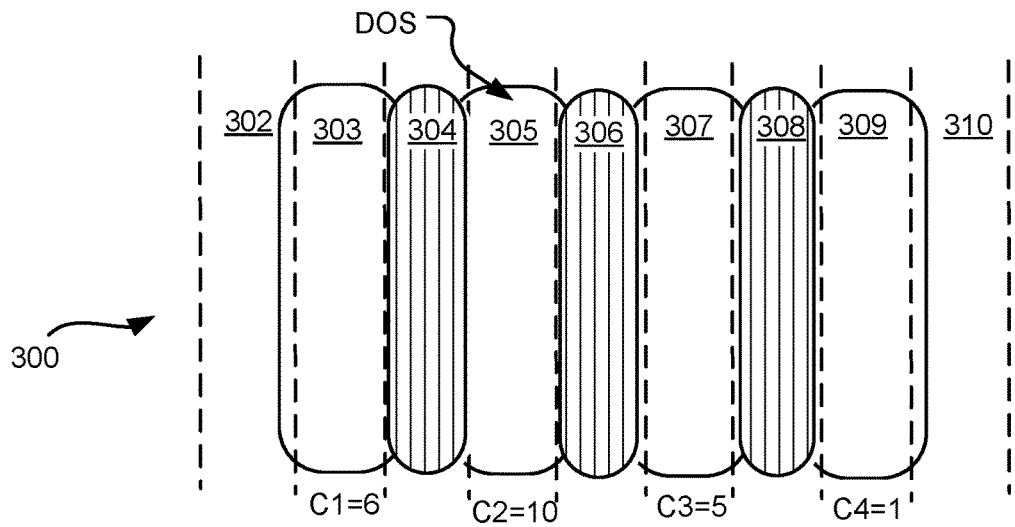
FIG. 3A illustrates example post-write scan operations of a data management system implementing IMR storage techniques.

FIG. 3A illustrates example post-write scan operations of a data management system 300 implementing IMR storage techniques. The data management system 300 includes a magnetic disc with a number of substantially circular data tracks (e.g., data tracks 303-309) storing data at variable written track widths and linear densities. For example, odd-numbered data tracks 303, 305, 307 and 309 (collectively, the "bottom data tracks") store data at a first written track width and linear density while even-numbered data tracks 304, 306, and 308 (collectively, the "top data tracks") store data at a second written track width and linear density.

Over time, ATI resulting from repeated data writes to one or more of the top data tracks can cause some data degradation on the associated, directly adjacent bottom data tracks. For example, a repeated data write to the data track 304 can cause degradation to the directly-adjacent bottom data tracks 303 and 305.

To help monitor a severity of degradation at various radial positions on the disc, a data degradation management module (not shown) of the data management system 300 manages a write counter (e.g., write counters C1, C2, C3, and C4) in association with each of the bottom data tracks 303, 305, 307 and 309. Each time data is received on a top data track, track write counters increment in association with any bottom data tracks immediately adjacent to the top data track receiving the data. For example, the track write counter C2 of the data track 305 increments from an existing value (e.g., 9) to a new value (e.g., 10, as shown) when data is written to the top data track 306. In addition, a write to the data track 306 also increments the track write counter C3 of track 307.

In one implementation, the degradation management module of the data management system 300 initiates a DOS of a bottom data track when the associated track write counter reaches a count threshold. For example, a DOS may read data from the data track 305 when a count of the track write counter C2 equals '10' (as shown in FIG. 3A).

Responsive to the DOS, the degradation management module determines a number of read errors that occurred in reading the data track 305. If the total number of read errors equals or exceeds an error threshold, the degradation management module 320 performs further post-write scan operations, as described below with respect to FIG. 3B. If the total number of read errors does not equal or exceed an error threshold, no further post-write scan operations are performed.

Figure 3B:
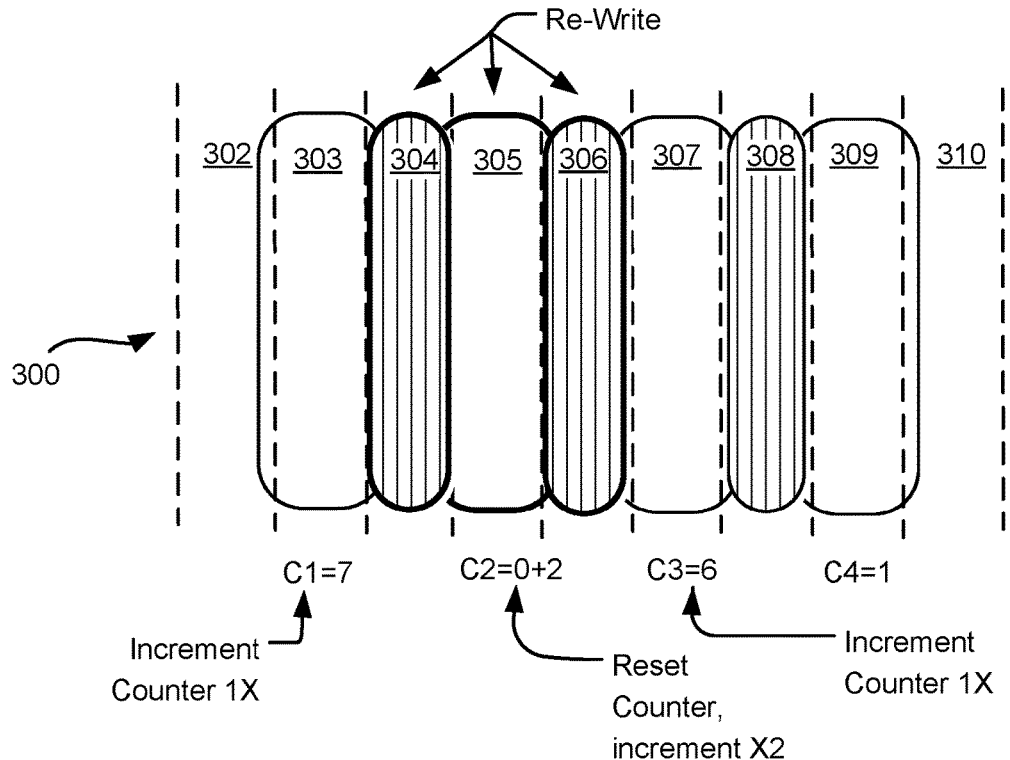
FIG. 3B illustrates additional example post-write scan operations of the data management system of FIG. 3A.

FIG. 3B illustrates a rewrite of data tracks 304, 305, and 306 responsive to a determination that a DOS scan of the data track 305 results in a number of read errors satisfying an error threshold. Re-writing the data track 305 is a multi-step process including the following operations in the following order: (1) reading data of the data tracks 304, 305, and 306 into a memory cache; (2) re-writing data of the data track 305 from the memory cache; and (3) re-writing data to the data tracks 304 and 306 from the memory cache.

Responsive to a re-write of any individual bottom data track, an associated track write counter is reset to a default value. For example, the re-write of the data track 305 resets the associated track write counter C2 from '10' to '0.' Further, the re-write of the top data track 304 increments the track write counter C1 of the bottom data track 303 from '6' to '7' and also increments the track write counter C2 of the bottom data track 305 to increment from '0' to '1.' Similarly, the re-write of the data track 306 increments the track write counter C3 of the bottom data track 307 from '5' to '6' and also increments track write counter C2 of the bottom data track 305 from '1' to '2.' In the illustrated manner, the data management system 300 monitors and repairs data degradation across the surface of the magnetic disc, periodically repairing data degradation before such degradation becomes significant.

In one implementation, the degradation management module performs post-write scan operations on more than one data track at once. If, for example, the write track counters for two or more adjacent odd data tracks (e.g., data tracks 305 and 307) reach a count threshold at the same time, the degradation management module may perform a DOS on each of the adjacent odd data tracks and optionally re-write more than three data tracks at once.

For example, the data tracks 305 and 307 may have associated write track counters that reach a count threshold simultaneously. In this situation, the degradation management module reads both of the data tracks 305 and 307 and determines, for both data tracks, whether a resulting number of read errors exceeds an error threshold.

If the resulting number of read errors exceeds the error threshold for one of the data track, such as data track 305 but not the data track 307, the data track 305 is re-written along with adjacent top data tracks 304 and 306, as described above. The data track 307 is not re-written at this time. In one implementation, however, the track write counter C3 of the data track 307 is re-set to another value after the DOS terminates, even if the data track 307 is not re-written. This new value of the write track counter C3 depends on the number of read errors detected during the DOS of the data track and is a value that is less than the predetermined count threshold (e.g., 10) but greater than the default reset value (e.g., 0). If, for example, there are relatively few read errors detected during the DOS of the data track 307, the write track counter C3 may be re-set to a medium-low value (e.g., 1). However, if, there are a large number of read errors detected, the write track counter C3 may be set to a medium-high value (e.g., 6).

If, on the other hand, the DOS of the data tracks 305 and 307 results in a number of read errors exceeding the error threshold for both of the data tracks 305 and 307, the degradation management module re-writes a group of more than three data tracks (e.g., 304-308) all at once. For example, the degradation management module may perform the following operations in the following order: (1) read the data tracks 304, 306, and 308 into a memory location; (2) re-write the data tracks 305 and 307; and (3) re-write the data tracks 304, 306, and 308.

If, however, the resulting number of read errors exceeds the error threshold for both of the adjacent odd data tracks 305 and 307, the degradation management module re-writes a group of more than three data tracks (e.g., 304-308) all at once. For example, the degradation management module may perform the following operations in the following order: (1) read the data tracks 304, 306, and 308 into a memory location; (2) re-write the data tracks 305 and 307; and (3) re-write the data tracks 304, 306, and 308.

Figure 4:
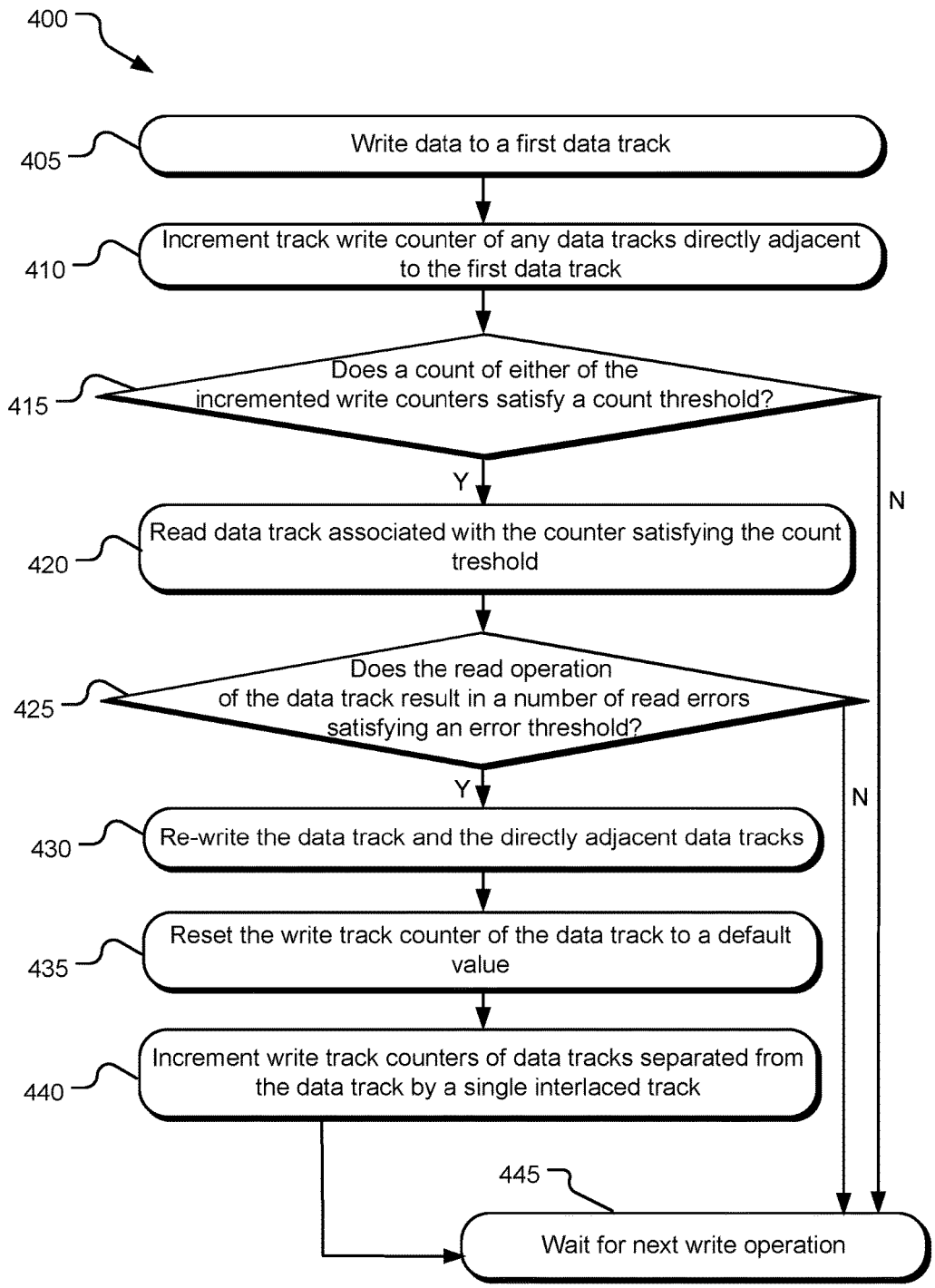
FIG. 4 illustrates example operations for monitoring and rectifying data degradation in a data management system implementing IMR storage techniques.

FIG. 4 illustrates example operations 400 for monitoring and rectifying data degradation in a data management system implementing IMR storage techniques. The data management system includes a plurality of track write counters that each quantify a risk of degradation for an associated data track in a series of alternating data tracks on the magnetic disc. In at least one implementation, the data management system does not include track write counters quantifying a risk of degradation for any of a series of interlaced data tracks making up alternating (e.g., every other) track on the storage medium. For example, write counters may be associated with each of the odd-numbered data tracks but not associated with any of the even-numbered data tracks.

A first write operation 405 writes data to a first data track. For example, the first data track may be a defined "top" data track with edges that slightly overlap and overwrite outer boundaries of two adjacent previously-written "bottom" data tracks (hereinafter "second" and "third" data tracks). When the first (e.g., top) data track is written, a chance of degradation of the second and third (e.g., bottom) data tracks increases. To track this increased likelihood, an incrementation operation 410 increments track write counters of the second data track and the third data track by a predetermined amount (e.g., 1 count).

A determination operation 415 determines whether a count of any of the track write counters satisfies a count threshold. If none of the track write counters has a count value satisfying the count threshold, a waiting operation 445 waits for the next write operation. On the other hand, if the determination operation 415 determines that any one of the track write counters in the data management system has a count value satisfying the count threshold, one or more post-write scan operations are performed.

A reading operation 420 reads the data track corresponding to the counter satisfying the threshold (hereinafter, the degraded data track). A determination operation 425 then determines whether the reading operation 420 of the degraded data track results in a number of read errors satisfying an error threshold. If the reading operation 420 does not result in a number of read errors satisfying a count threshold, the waiting operation 445 resumes to wait for the next write operation.

If, on the other hand, the determination operation 425 determines that the reading operation 420 results in a number of read errors satisfying an error threshold, a re-write operation 430 rewrites the degraded data track and its directly adjacent data tracks. In one implementation, the re-writing of the degraded data track entails the following operations in the following order (1) reading the degraded data track and the directly adjacent data tracks into a memory location; (2) re-writing, from memory, the data of the degraded data track; and (3) re-writing, from memory, the data of the directly adjacent top data tracks.

Responsive to a re-write of the degraded data track, a reset operation 435 resets the track write counter of the degraded data track to a default value (e.g., 0). An incrementation operation 440 increments track write counters of various data tracks responsive to the re-write operation 430. In one implementation, the track write counter of the degraded data track is incremented twice to account for re-writes of each of the directly adjacent top data tracks. Further, track write counters are incremented for each of the bottom data tracks on either side of the degraded data track and separated from the degraded data track by one interlaced (top) data track (see, e.g., track write counters 303 and 307 incrementing responsive to rewrite of data track 305 in FIG. 3B). After the incrementation operation 440, the waiting operation 445 resumes to wait for the next write operation.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. One or more tangible computer-readable storage media encoding computer-executable instructions for executing on a computer system a computer process, the computer process comprising:
   incrementing a track write counter of a first data track responsive to a data write command to a second data track but not incrementing any track write counters responsive to a data write to the first data track.

2. The tangible computer-readable storage media of claim 1, wherein the computer process further comprises:
   re-writing data of the first data track and data of at least one directly adjacent data track based on a count value of the track write counter.

3. The tangible computer-readable storage media of claim 1, wherein the computer process further comprises:
   reading the first data track if a count of the track write counter satisfies a count threshold; and
   re-writing data of the first data track if a number of read errors detected during the reading of the first data track satisfies an error threshold.

4. The tangible computer-readable storage media of claim 1, wherein the track write counter quantifies a risk of data degradation of the first data track.

5. The tangible computer-readable storage media of claim 1, wherein the first data track is directly adjacent to the second data track.

6. The tangible computer-readable storage media of claim 2, wherein re-writing the first data track and at least one directly adjacent data track further comprises:
   re-writing data of data tracks directly adjacent to the first data track.

7. The tangible computer-readable storage media of claim 2, wherein the computer process further comprises:
   resetting the track write counter of the first data track to a default value.

8. A method comprising:
   incrementing a first track write counter responsive to a data write to a first data track but not incrementing any track write counters responsive to a data write to a second data track directly adjacent to the first data track.

9. The method of claim 8, wherein the method further comprises:
   re-writing data of the first data track and data of the second data based on a count value of the first track write counter.

10. The method of claim 8, wherein the method further comprises:
    reading the first data track if a count of the track write counter satisfies a count threshold; and
    re-writing data of the first data track if a number of read errors detected during the reading of the first data track satisfies an error threshold.

11. The method of claim 9, further comprising:
    resetting the track write counter of the first data track to a default value.

12. The method of claim 9, further comprising:
    incrementing a track write counter of a third data track and a track write counter for a fourth data track responsive to the re-write of data of the first data track, the second data track and the third data track each separated from the first data track by one interlaced data track.

13. A storage system comprising:
    a degradation management module configured to increment a track write counter of a first data track responsive to a data write command to a second data track but not increment any track write counters responsive to a data write to a second data track directly adjacent to the first data track.

14. The storage system of claim 13, further comprising:
    a read/write management module coupled to a memory and configured to re-write data of the first data track and data of at least one data track directly adjacent to the first data track based on the value of the write track counter.

15. The storage system of claim 13, wherein the first data track is directly adjacent to the second data track.

16. The storage system of claim 14, wherein the degradation management module is further configured to reset the track write counter to a default value responsive to the re-write of data of the first data track.

17. The storage system of claim 14, wherein the degradation management module is further configured to increase the track write counter of the first data track responsive to the re-write of the data of the at least one adjacent data track.

18. The storage system of claim 14, wherein the degradation management module is further configured to increment a track write counter of a third data track and a track write counter for a fourth data track responsive to the re-write of the data of first data track, the third data track and the fourth data track each separated from the first data track by one interlaced data track.

19. The storage system of claim 14, wherein the read/write management module re-writes data of the first data track before writing data of the at least one data track directly adjacent to the first data track.

* * * * *